US007114222B2

(12) United States Patent
Lemire et al.

(10) Patent No.: US 7,114,222 B2
(45) Date of Patent: Oct. 3, 2006

(54) SURVIVAL HOOK

(76) Inventors: Yvon Lemire, 716, Chemin Du Village, C.P.13, Laforce, Quebec (CA) J0Z2J0; Urbain Brouillard, 1120, Rang 5, Laforce, Quebec (CA) J0Z2J0

( * ) Notice: Subject to any disclaimer, the term of this patent is extended or adjusted under 35 U.S.C. 154(b) by 86 days.

(21) Appl. No.: 10/919,499

(22) Filed: Aug. 17, 2004

(65) Prior Publication Data

US 2005/0108862 A1 May 26, 2005

Related U.S. Application Data

(60) Provisional application No. 60/523,293, filed on Nov. 20, 2003.

(51) Int. Cl.
*B63C 9/32* (2006.01)
*B65G 7/12* (2006.01)

(52) U.S. Cl. ............................ 24/370; 24/371; 294/25

(58) Field of Classification Search ................. 24/376, 24/371, 373, 592.1; 441/82
See application file for complete search history.

(56) References Cited

U.S. PATENT DOCUMENTS 758,196 A * 4/1904 Thomas ...................... 294/25
1,274,481 A 8/1918 West
1,346,894 A 7/1920 Jacobs
2,278,610 A 4/1942 Brownson et al.
2,812,206 A * 11/1957 Brunn ........................ 294/26
2,969,572 A * 1/1961 Poe ........................... 24/371
3,477,756 A * 11/1969 Castro ........................ 294/25
3,752,524 A 8/1973 Reick, Jr.
3,981,526 A 9/1976 Lundqvist
4,865,571 A 9/1989 Caramanica
5,924,752 A 7/1999 Moody
6,244,639 B1 6/2001 Storek

* cited by examiner

*Primary Examiner*—Robert J. Sandy

(57) ABSTRACT

A survival hook consisting of a pair of hooks rotationally attached to a plate which is itself provided with fastening means to retain the plate over clothing, typically over the forearm of a user. The plate can be of a strap-on type by way of fastening means or can be sown as part of the clothing or alternatively, it can be fixedly attached to the clothing by mechanical fastening means, adhesive means or combination thereof. The hands are always free and unencumbered and the moving elements are simple enough that it is unlikely that jamming through frost or packed snow or ice can occur and hinder proper operation of the invention. The pair of hooks are normally folded against the plate so as not show their pointy ends, and are folded out only when needed.

7 Claims, 4 Drawing Sheets

SURVIVAL HOOK

This application claims prioity based on Provisional Application No. 60/523,293 filed Nov. 20, 2003.

BACKGROUND OF THE INVENTION

1. Field of the Invention

The invention relates generally to safety equipment but more particularly to an emergency hook for getting out of a fall through ice over water 2. Background of the Invention Accidents involving people falling through ice covered lakes and rivers can sometimes result in death due to drowning or hypothermia. The problem is that it is sometimes very difficult to grab a good hold on ice and often times, a victim will become exhausted in trying to get out of the water.

Over the years, inventors have tried to come up with devices to help someone who has fallen into the water to get out quickly and safely. Unfortunately, these devices are not always practical or reliable since a number of them are to be worn on the hands of a user, which precludes the accomplishment of manual activities, which makes the user not wear them, which defeats the purpose since one never knows when ice will break. Other inventions feature telescoping or extendable devices worn on the forearms but the moving parts make them likely to jam especially given that they will be immersed in cold water and may freeze the moment they are taken out of the water. For these reasons, there is a need for an improved survival hook.

SUMMARY OF THE INVENTION

The invention consists of a pair of hooks rotationally attached to a plate which is itself provided with fastening means to retain the plate over clothing, typically over the forearm of a user. The plate can be of a strap-on type by way of fastening means or can be sown as part of the clothing or alternatively, it can be fixedly attached to the clothing by mechanical fastening means, adhesive means or combination thereof. The hands are always free and unencumbered and the moving elements are simple enough that it is unlikely that jamming through frost or packed snow or ice can occur and hinder proper operation of the invention. The pair of hooks are normally folded against the plate so as not show their pointy ends, and are folded out only when needed.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE PREFERRED EMBODIMENT

Figure 1:
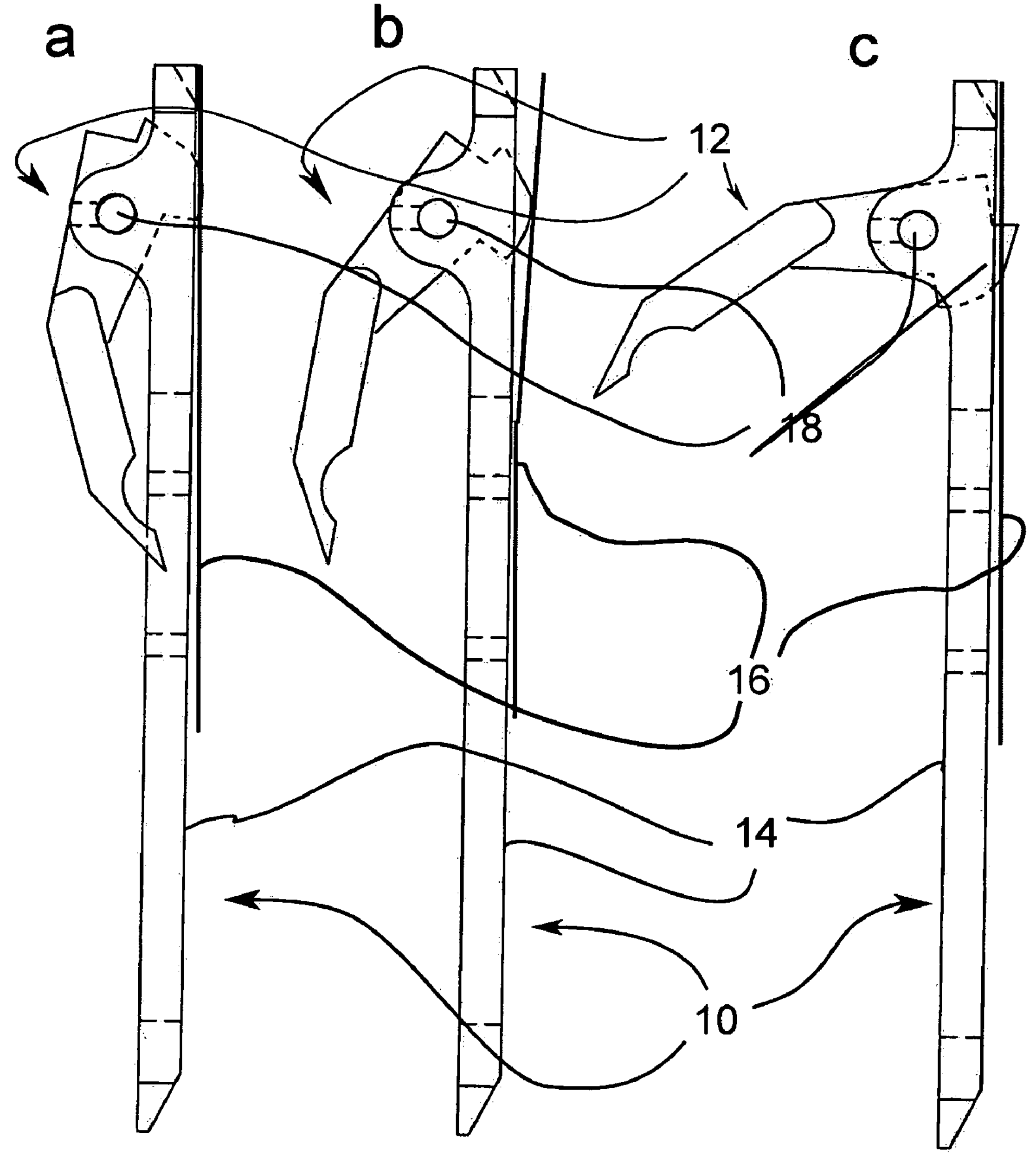

FIGS. 1*abc* Side views of the survival hook closed and at rest, partially open, and fully open in operational mode.

FIGS. 2*ab* Bottom and side views of the base plate, respectively.

FIGS. 3*ab* Bottom and side views of the joined hooks, respectively.

Figure 4:
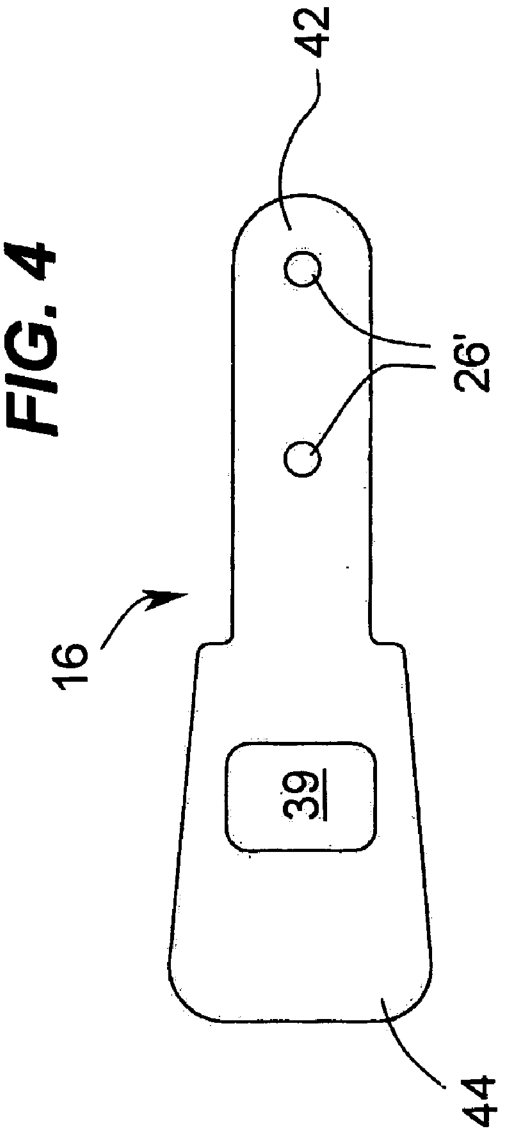

FIG. 4 Bottom view of the biasing means.

Figure 5:
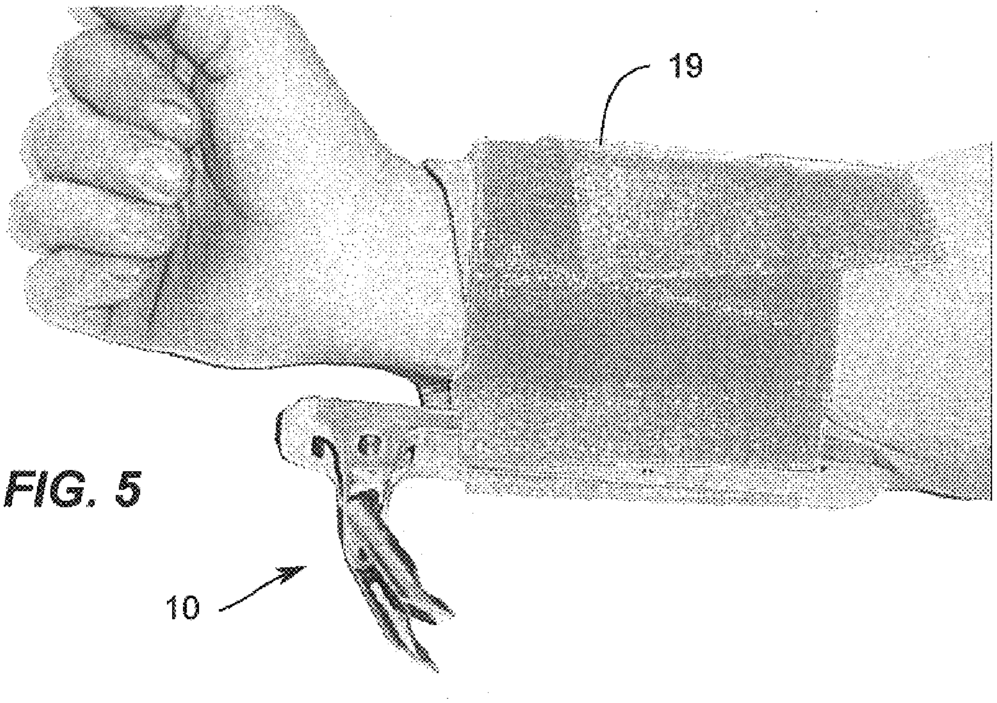

FIG. 5 Perspective view of the survival hook on a user.

DETAILED DESCRIPTION OF THE PREFERRED EMBODIMENT

A survival hook (10) is comprised of key components: a pair of joined hooks (12), a base plate (14), a biasing means (16) a pin (18) to join the base plate (14) to the hooks (12) in a rotationally connected fashion, and optional fastening means (19). Usually there is one survival hook (10) for each arm. Survival hooks (10) for legs could be used as well but generally, when one needs to get out of water, legs do not have any anchoring points and by the time they do, the body is pretty much out of the water. Also, it would be imprudent to try to reach for one's legs when in water. It is therefore for practical reasons rather than inventive reasons that the description tends to favor survival hooks (10) positioned over the forearms but a user can wear them as he sees fit without departing from the scope of the invention.

FIGS. 1*abc* show how the biasing means (16) biases the hooks (12) into either the mode in FIG. 1*a*, which is the rest or closed mode, or the mode in FIG. 1*c*, which is the operative or open mode. FIG. 1*b* is an intermediate mode showing the resistance applied by the biasing means (16) in order to keep the hooks (12) in a closed mode and it is only by applying force that a user can rotate the hooks from mode in FIG. 1*a* to mode in FIG. 1*c*.

Figure 2:
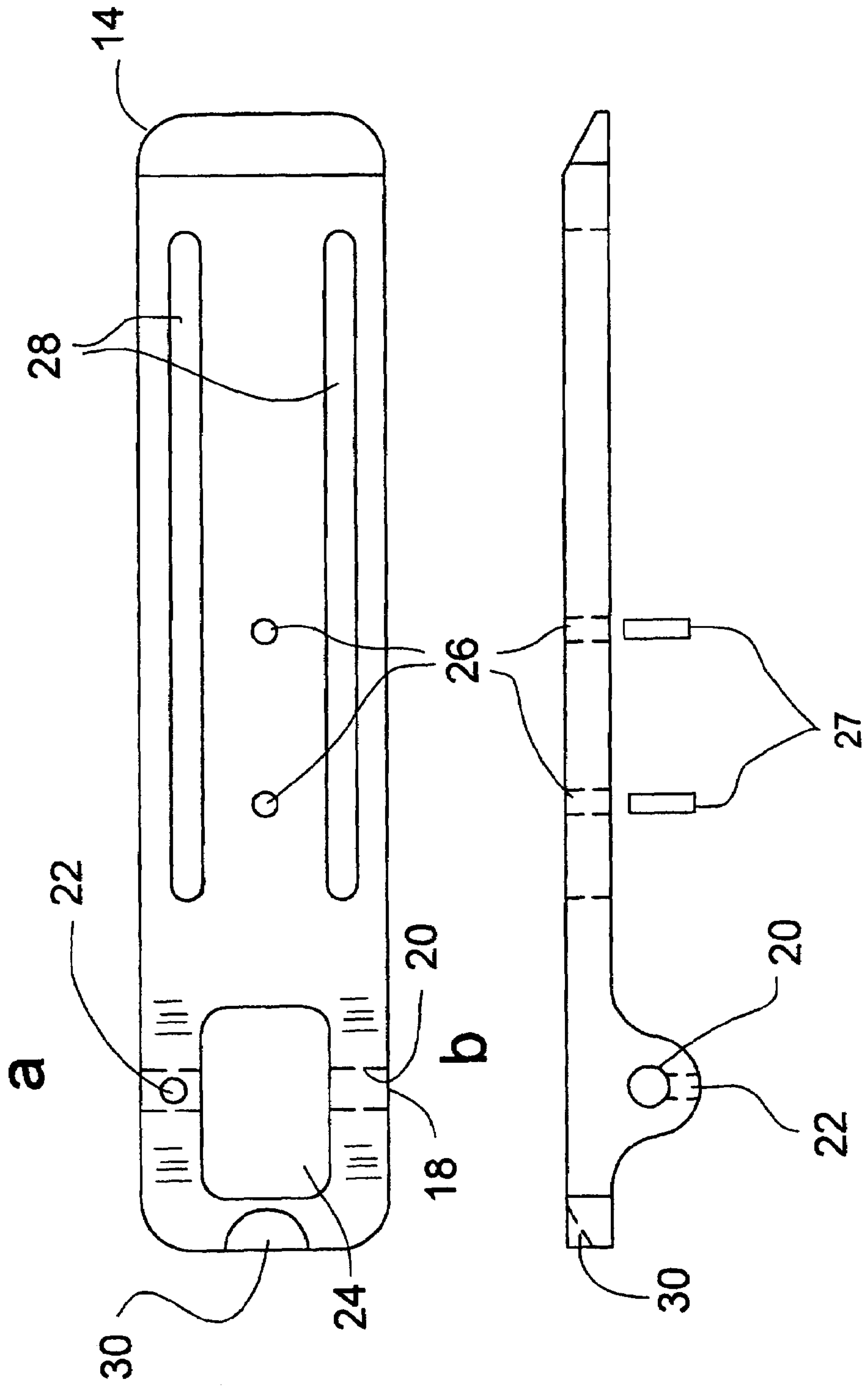

FIG. 2 The base plate (14) has a pin channel (20) through which passes the pin (18), a pin retaining means (22) maintains the pin (18) in place within the channel (20). Pin retaining means (22) are known in various art and generally consist of either a frictionally inserted pin, which is inserted through the pin channel (20) all the way into the pin (18), or a threadably inserted pin. A hole (24) is designed to let pass components of the joined hooks (12), which will be described later, when the hooks (12) move from one mode to the next. Mechanical fastening means (not shown) pass through mechanical fastening means holes (26) to mechanically connect the base plate (14) to the biasing means (16). Slots (28) are present when a fastening means (19) such as seen in FIG. 5 is used for strapping the survival hook (10) to the forearm of a user. When using such a fastening means (19), more than just one strap can be used to better adjust since the forearm varies in size along its length.

Figure 3:
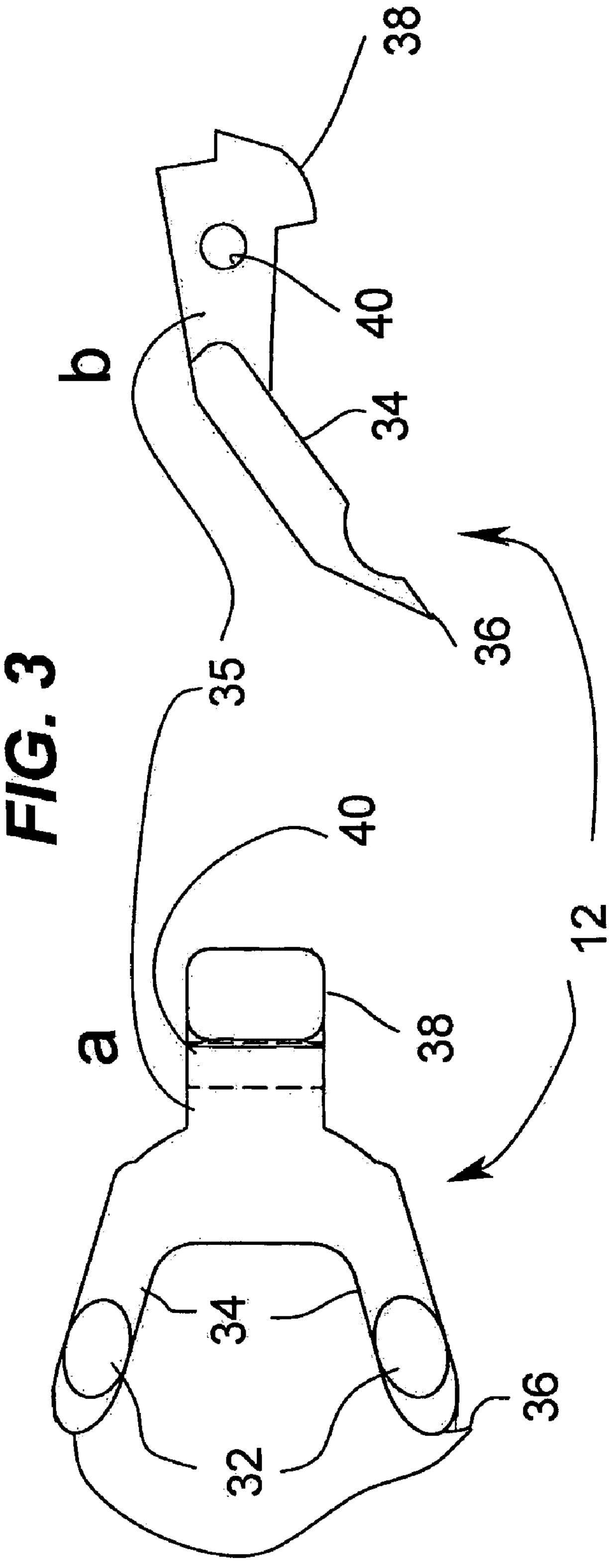

FIG. 3 The hooks (12) are generally <<Y>> shaped and made of two hooking parts (34) that are joined at a stem (35) which comprises a rotational axis channel (40) through which passes the pin (18). Each hooking part (34) is further comprised of a tip (36), to interact with ice or snow, a concave passage (32), proximal the tip (36), creates room for packing ice and snow so as to provide a better grip. An engagement bulge (38) extending from the stem (35) passes through the hole (24) of the base plate (14) described earlier and is configured and sized to snugly fit into an engagement hole (39) which maintains the hooks (12) into an open, operational mode.

FIG. 4 The biasing means (16) has a tongue (42) which is tightly engaged to the base plate (14) by way of mechanical fasteners (27) passing through mechanical fastening means holes (26'). A tab (44) has the engagement hole (39) described earlier and is flexible and resilient so as to provide its biasing function which, besides holding the engagement bulge (38) by way of the engagement hole (39) also maintains the hooks (12) into the closed mode(see FIGS. 1*abc*).

In order to lift the biasing means (16) so as to disengage the engagement bulge (38) from the engagement hole (39), a finger opening (30) allows room for a finger or any oblong object to engage and lift the biasing means (16).

Besides using a fastening means (19) which can be either of a hook and pile type or an elastic band type or any such means, the base plate (14) can be sewn into the fabric of the sleeves of a piece of clothing.

The invention claimed is:

1. A survival hook for getting out of the water comprising:

a pair of joined hooks rotationally connected to a base plate, and a biasing means;

a hole to allow passage of an engagement bulge extending from a stem, said engagement bulge and said stem being integral components of said hooks;

said biasing means being mechanically connected to said base plate;

said biasing means having a tongue tightly engaged to said base plate by way of mechanical fasteners passing through mechanical fastening means holes, a tab further comprised of said engagement hole and being flexible and resilient so as to provide biasing functions for maintaining said hooks into a closed mode and holding said engagement bulge by way of said engagement hole in an open mode.

2. A survival hook for getting out of the water as in claim 1 wherein:

said hooks being rotationally connected to said base plate by way of a pin and said base plate having a pin channel through which passes said pin;

said stem having a rotational axis channel through which passes said pin.

3. A survival hook for getting out of the water as in claim 1 wherein:

slots for engaging fastening means used for strapping around the forearm of a user.

4. A survival hook for getting out of the water as in claim 1 wherein:

a finger opening to allow room for a finger or any oblong object to engage and lift said biasing means in order to disengage said engagement bulge from said engagement hole.

5. A survival hook for getting out of the water as in claim 2 wherein:

a pin retaining means for retaining said pin within said channel.

6. A survival hook for getting out of the water as in claim 1 wherein:

said hooks being generally <<Y >> shaped and made of two hooking parts joined at a stem;

each said hooking part further comprised of a tip to interact with ice or snow, and a concave passage proximal said tip to prevent ice clogging.

7. A survival hook for getting out of the water as in claim 5 wherein:

said hooks being generally <<Y >> shaped and made of two hooking parts joined at a stem;

each said hooking part further comprised of a tip to interact with ice or snow, concave passage proximal said tip to prevent ice clogging.

* * * * *